UNITED STATES PATENT OFFICE.

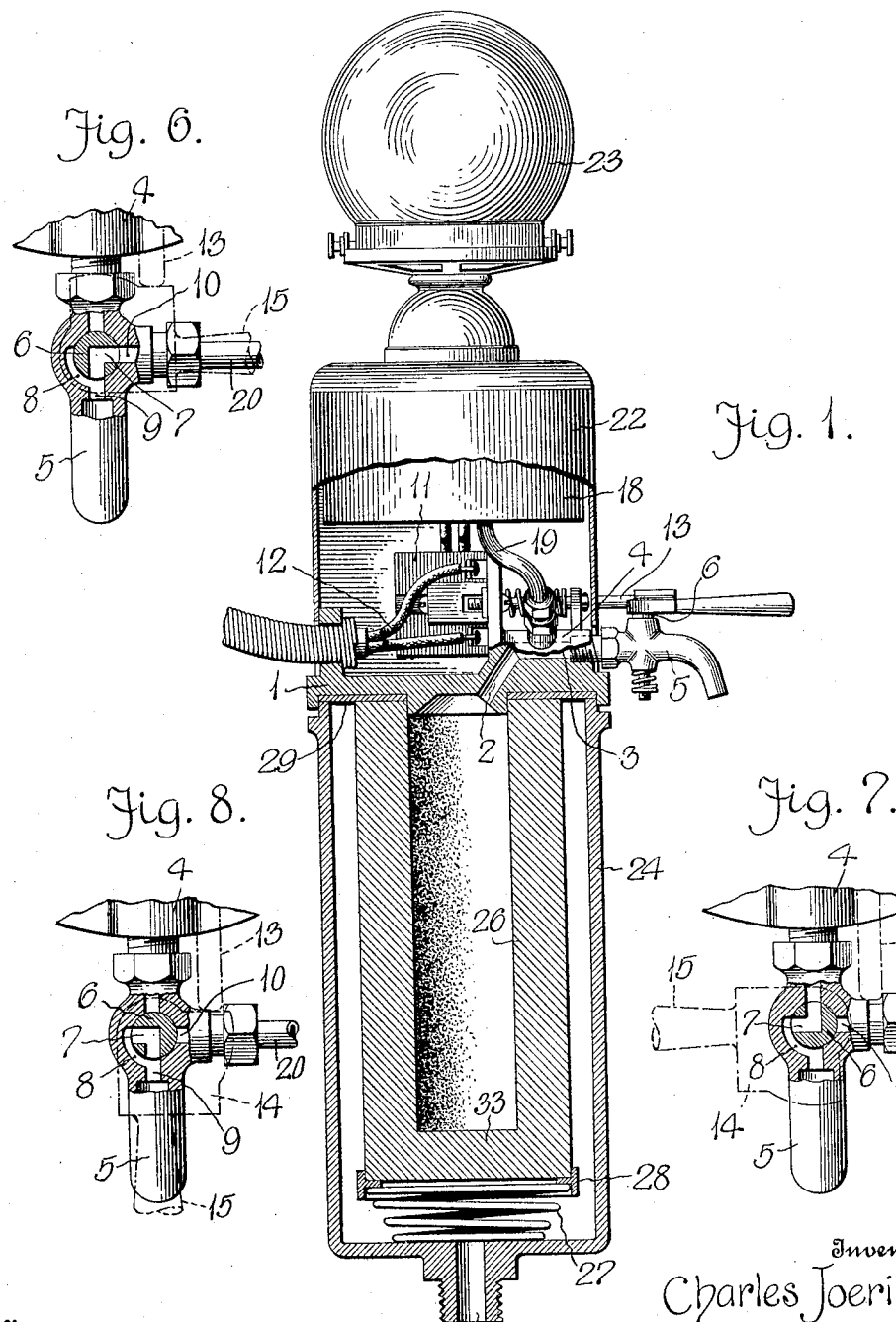

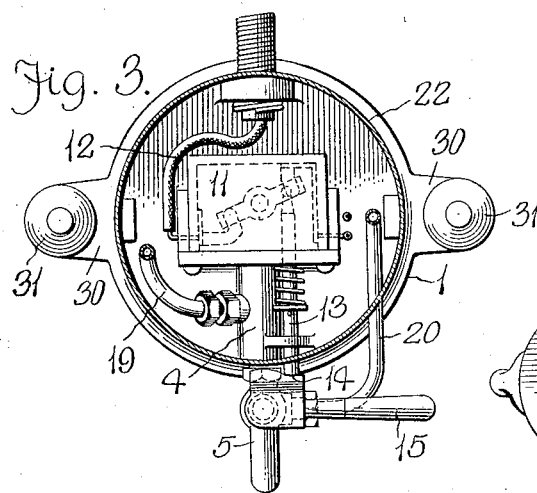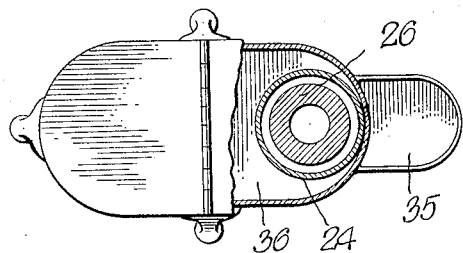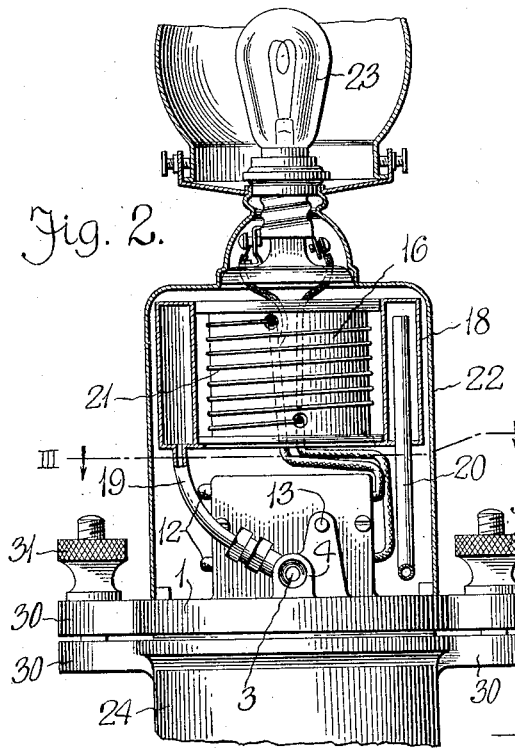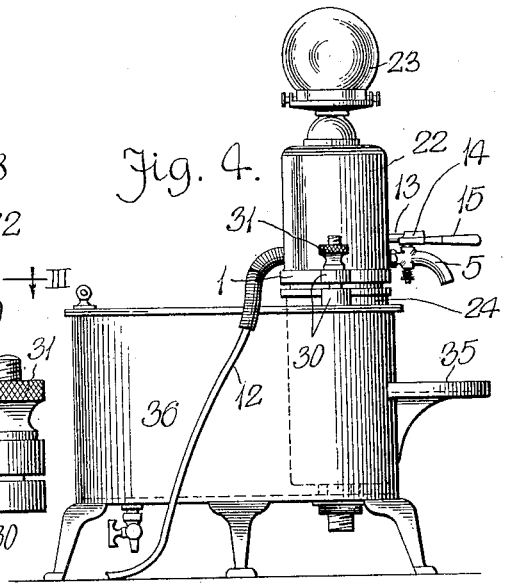

CHARLES JOERIN, JR., AND ALBERT E. JOERIN, OF DETROIT, MICHIGAN.

WATER COOLING AND HEATING FILTER.

1,181,387.

Specification of Letters Patent.

Patented May 2, 1916.

Application filed October 13, 1915. Serial No. 55,626.

*To all whom it may concern:*

Be it known that we, CHARLES JOERIN, Jr., and ALBERT E. JOERIN, citizens of the United States of America, residing at Detroit, in the county of Wayne and State of Michigan, have invented certain new and useful Improvements in Water Cooling and Heating Filters, of which the following is a specification, reference being had therein to the accompanying drawings.

In the operation of filters in dental offices, hospitals, doctors' offices, lunch counters, bars and the like, it is desirable not only to be able to obtain an instantaneous supply of hot water but also of cold water, without having to wait until the apparatus for heating the water or the parts thereof are cooled by the passage of water therethrough, as is common in certain forms of water heaters.

This invention relates to a combined hot and cold water filter and to an arrangement of parts thereof that not only permit the instantaneous supplying of either cold or hot water without waiting for the passage of either through the apparatus, in order to change the temperature of the apparatus, but also to means permitting the ready access to the filter for cleaning it and to other advantages that make the device particularly practicable for use in surgical and dental rooms, hospitals and behind lunch counters, bars and the like.

The invention consists in the matters hereinafter set forth, and more particularly pointed out in the appended claims.

Referring to the drawings, Figure 1 is a view, partially in longitudinal section and partially in elevation, of a combined heater and filter that embodies features of the invention; Fig. 2 is a view, partially in elevation, and partially in longitudinal section, showing the heating elments and connections of the filter more in detail; Fig. 3 is a view in transverse section taken on or about line III—III of Fig. 2; Fig. 4 is a view in elevation of the device, on a smaller scale, shown provided with an ice chamber; Fig. 5 is a view in detail of the ice chamber and inclosed filter; Fig. 6 is a view in detail of a preferred form of controlling faucet, shown in position for the delivery of hot water; Fig. 7 is a similar view of the faucet in position for delivering cold water; and Fig. 8 is a view showing the faucet in closed position.

In the drawings, a base 1 has an inlet duct 2 opening up from the lower face thereof, and connecting with the bore 3 of a boss 4 into the outer end of which a faucet 5 is screwed or otherwise appropriately applied. A rotatable, spring pressed tapered plug 6 of the faucet has a pass 7 therethrough, one end of which may be brought into register with the bore 3 of the boss while the other end connects with a channel 8 that leads around the plug to the discharge opening 9 of the faucet as indicated in Fig. 7. This affords direct connection between the inlet 2 and the discharge of the faucet for the purpose of delivering cold water. The duct is also arranged through the plug so that it may be brought into the position indicated in Fig. 6 with one end discharging into the outlet of the faucet and the other end connected with a hot water inlet indicated at 10. Or as shown in Fig. 8, the closure may be turned to cut off the inlet. An electric switch block 11 is mounted on the plate 1 with suitable conductors 12 leading thereto and arranged to be connected to any suitable source of electrical energy. The switch which may be of any type, is arranged to be operated by a push rod 13 that is normally spring projected so as to abut against a lug 14 on the handle 15 of the faucet and thereby move the switch to closed position when the handle is turned as shown in Fig. 3 with connections for hot water. The conductors lead to the heating elements 16 of any preferred type adapted to be mounted in an annular closed chamber 18 of copper or like conducting material that is supported above the switch block and at an interval above the base by means of a feed pipe 19 tapped into the boss 4, and by means of an outlet pipe 20 that extends through the base of the chamber to a point near the top thereof and is connected at its lower end into the hot water inlet of the boss as indicated in Fig. 6. A suitable casing 22 is slipped over the chamber and the switch block to rest on the base and preferably carries at its upper end a signal lamp 23 that is connected in parallel with the heating element 21.

A water filter is detachably secured against the lower face of the base 1. Preferably this consists of a casing 24 having a water inlet 25 fitted for connection with a suitable source of water supply, on the base thereof. A cylindrical filter element 26 of any preferred material, is supported concentrically within the casing by means of a foot spring 27. It bears upwardly against a suitable gasket or collar 28 and thereby presses the filter to seat against a gasket 29 interposed between the upper face of the filter and the lower face of the base, suitable flange and lug connections, such as indicated at 30, with binding screws 31 adapted to be operated by hand, holding the parts firmly in proper position. The lower end of the filter may be open with the gasket 28 extended there-across, but preferably the lower end of the filter has a wall 33 closing the bore thereof, the latter being of course in communication with the outlet 2 of the base. As a matter of convenience, a bracket 35 may be provided for the support of a glass or other vessel under the faucet. This bracket may, of course, be applied directly to the filter casing 24, but as indicated in Figs. 4 and 5 the filter may be placed in an ice holder 36 of appropriate style. In such instance the bracket is applied to the outer portion of the tank or ice container wall.

As a result of this construction, turning of the faucet in one way throws the heating element into operation and makes direct connection from the top of the tank where the water is the hottest with the faucet so that hot water is almost instantly obtainable. When cold water is desired, it is drawn directly from the interior of the filter and as the heating element is above the filter, the intervening air space effectively prevents the base and the water connection through the boss that discharges into the faucet, becoming heated and therefore the water is at the filter temperature. If this is used in connection wtih the ice tank it is of course capable of delivering ice cold water. On the other hand if the hot water connection is open, and this of course means that the heating element is energized, hot water from the top of the annular reservoir is at once forced through the faucet. The signal lamp insures proper working and at the same time is ornamental. By unclamping the filter casing, the filter element comes away therewith, and is therefore readily accessible for cleansing.

Obviously, changes in the details of construction may be made without departing from the spirit of our invention and we do not care to limit ourselves to any particular form or arrangement of parts.

What we claim is:—

1. A hot and cold water filter comprising a filter, a water heating chamber above the filter and in open communication therewith, a faucet having a direct intake from the filter, a direct intake from the heating chamber and an outlet common to both, means for heating the chamber controlled by the faucet to operate when the faucet is open to deliver hot water, and means for detachably interconnecting the filter and other parts.

2. A hot and cold water filter comprising a filter chamber, a base on which the filter chamber is detachably secured, a filter member in the chamber yieldingly forced against the base when the parts are connected, a faucet on the base controlling a duct leading from the outlet of the filter, a water heating chamber mounted at an interval above the base and having a discharge delivering to the faucet and an intake connecting the filter outlet through the base with the interior of the chamber, heating means for the chamber controlled by the faucet, and a hot water delivery pipe leading from the upper portion of the chamber to the hot water faucet.

3. A hot and cold water filter comprising a base having an inlet from its lower end discharging into a boss that terminates in a faucet, a filter casing having an inlet at its lower end, and means at the upper end for securing it detachably against the under face of the base, a filter element in the base, means for yieldingly pressing the filter element against the base with the dischage thereof opening into the discharge through the base, a heating chamber mounted on the base at an interval thereover, and provided with an intake leading from the filter outlet in the base, and an outlet leading from the upper portion thereof to the faucet, the latter being adapted to connect either the filter discharge or the chamber discharge with the faucet outlet, means for heating the chamber, and controlling means interposed between the base and the chamber and controlled by the faucet to throw the heating means into operation when the faucet is open to deliver hot water.

4. A hot and cold water filter comprising a base having an outlet from its lower face opening into a boss that terminates in a faucet, a filter casing provided with a water inlet at its lower end and adapted to be secured against the face of the base at its upper end, means for holding the base and casing together, a filter element in the filter casing closed at the lower end and with the upper open end against the base, means for yieldingly forcing the filter element against the base, a heating chamber supported on the base, means for heating the chamber, means between the chamber and base for controlling the heating means, connections between the outlet of the filter and the chamber and between the faucet and the chamber, and means on the faucet to operate the heat controlling means and throw the heating means into action when the faucet is turned to discharge from the heating chamber.

In testimony whereof we affix our signatures in presence of two witnesses.

CHARLES JOERIN, Jr.
ALBERT E. JOERIN.

Witnesses:
ANNA M. DORR,
LEWIS E. FLANDERS.

Copies of this patent may be obtained for five cents each, by addressing the "Commissioner of Patents, Washington, D. C."